United States Patent [19]

Martin

[11] 3,753,748

[45] Aug. 21, 1973

[54] HYDRAULIC CEMENT RETARDER COMPOSITION

[75] Inventor: Robert C. Martin, Tulsa, Okla.

[73] Assignee: The Dow Chemical Company, Midland, Mich.

[22] Filed: Dec. 23, 1971

[21] Appl. No.: 211,688

Related U.S. Application Data

[62] Division of Ser. No. 42,569, June 1, 1970, Pat. No. 3,662,830.

[52] U.S. Cl. .................................. 106/90, 106/315
[51] Int. Cl. ................................................ C04b 7/02
[58] Field of Search .................... 106/90, 104, 314, 106/315

[56] References Cited
UNITED STATES PATENTS

| | | | |
|---|---|---|---|
| 3,053,673 | 9/1962 | Walker | 106/90 |
| 2,292,616 | 8/1942 | Dailey | 106/315 |
| 2,211,368 | 8/1940 | Dickens | 106/315 |

*Primary Examiner*—Delbert E. Gantz
*Assistant Examiner*—J. W. Hellwege
*Attorney*—Griswald & Burdick

[57] ABSTRACT

In a method of cementing at relatively high ambient temperatures employing an aqueous hydraulic cement slurry, the improvement comprising admixing therewith an effective amount of both (1) a salt of lignosulfonic acid and (2) boric acid or a borate whereby a synergistic retarding effect on the setting rate of the slurry is attained without any accompanying adverse effects.

1 Claim, No Drawings

HYDRAULIC CEMENT RETARDER COMPOSITION

REFERENCE TO RELATED APPLICATION

This application is a division of application Ser. No. 42,569 filed June 1, 1970, now U.S. Pat. No. 3,662,830.

BACKGROUND OF THE INVENTION

Aqueous cement slurries are frequently desired to be used for construction of buildings, surfacing (e.g., roads, parking lots etc.) and in underground cementing operations, e.g., in geologic formations penetrated by a wellbore (usually employed therein for purposes for securing a casing in place or for water or brine shut-off), and in tunnels, dams, or reservoir constructions, wherein the ambient temperature is often relatively high thereby accelerating the rate of setting cement of the slurry to one which is too fast to permit adequate time for the preparation of the slurry and its proper emplacement in the formation allowing an acceptable safety margin for a satisfactory job.

There have been introduced into the art of cementing additaments to cement slurries for the purpose of retarding the rate of set, of various types, and in some instances the results have been promising.

However, the problems of controlling the setting rate of cement slurries at high temperatures without impairment of the ultimate strength values of the cement has not been fully solved and are especially persistent where well cementing jobs (with increasing frequency as the years go by) are often performed at ever greater depths wherein often the bottom hole temperature is much higher than can be accommodated by the use of conventional cement slurries even containing the additives in accordance with the latest advancements heretofore known.

Conventional cement slurry compositions usually employed in cementing of wells comprise (1) an hydraulic cement, i.e., Portland, aluminous, pozzolanic, or expansive cements, or mixtures thereof and sometimes also containing gypsum or the like, (2) water, and optionally (3) as need dictates, additional functional control agents for such properties as rate of setting (usually a function of thickening rate), fluid-loss to a porous material (e.g., a loosely consolidated geologic formation) in contact therewith during the setting period, and/or friction-reducing agents effective during movement through tubes, pipes, casings, and the like. Such compositions are known as neat cement. For most uses other than in association with wells, sand and also often gravel are admixed with the slurry to make concrete.

Fully acceptable thickening control agents or retardants to the rate of setting of hydraulic cement slurries have long been sought, especially those which are effective at relatively high ambient temperatures as, for example, those often encountered in downhole operations.

SUMMARY OF THE INVENTION

The invention is an improved aqueous hydraulic cement slurry and method of cementing wells employing it. The slurry contains as a required additament an improved retardant to the rate of setting thereof to a monolithic solid without adverse effect on ultimate compressive strength or other desirable qualities. The additament is a heretofore unknown combination which is much more effective at the usual troublesome higher temperatures, than would be expected from the behavior of each of the components of the combination when used separately in such slurry, said combination retardant being (1) an alkali metal, alkaline earth metal or alkali metal-alkaline earth metal salt of lignosulfonic acid and (2) boric acid or a borate, e.g., borax. Such combination results in a truly synergistic effect.

Excellent results are obtained at between about 175° and about 400° F. The invention is commonly practiced at between about 230° and about 350° F. There is seldom a need for use of the retardant at lower temperatures unless an exceptionally long setting period is desired. At temperatures above about 400° F. the time existing between mixing and emplacement may thereby be caused to be unduly short. However, if an extremely short setting period is desired, the invention will fill that need. The amount of the additive retardant based on 100 parts by dry weight of the hydraulic cement present is between about 0.5 and about 5.0 parts of component (1) and between about 0.5 and about 5.0 parts of component (2) to make a total of both (1) and (2) of between about 1.0 and 10.0 parts based on the dry weight of cement present. Between about 1 and 4.0 parts of each component are commonly and preferably employed.

Other ingredients may be present in the slurry if desired for their known effect e.g., for fluid-loss control of which cellulose and its derivative esters and/or ethers or polystyrene sulfonate or polyvinyltoluene sulfonate are illustrative, or friction-loss control agents as described in U.S. Pat. No. 3,254,719.

Silica flour, admixed with the aqueous cement slurry, has been found beneficial in preventing strength retrogression as the slurry sets at advanced temperatures. However, the invention may be practiced without silica flour being present.

The ratio of cement to water is that commonly employed, which may be between about 30 and about 65 parts (preferably between 35 and 50 parts) of water per hundred parts dry weight of cement.

The improved cement composition of the invention is emplaced in a geologic formation by way of a pipe assembly or conveyor system when the formation is penetrated by a wellbore; conventional pumping equipment and lay-out for well cementing are employed. Truck-mounted mixers provided with high velocity pumps are often used.

COMPARATIVE TESTS AND EXAMPLES OF THE INVENTION

The following basic recipe was followed in the comparative tests which are not illustrative of the practice of the invention:

100 parts by dry weight of Class H cement (as described in API RP 10B), 30 to 60 parts of water, and the amounts of either component (1) or (2), but not both (1) and (2), as shown in the following tables, were admixed. The borate used was a technical grade $Na_2B_4O_7 \cdot 10H_2O$. Class H cement is a high temperature cement and was used herein because it best represents practical operating or field usage under the conditions herein represented. Other cements can be used in the practice of the invention but may not be the best choice because Class H is especially made for use at unusually high temperatures.

The examples of the invention contain both components (1) and (2), water, and a Portland or aluminous cement.

Series One

In this series, tests wherein only one of the salt of lignosulfonic acid or borax was present, are identified by capital letters. Examples of the invention are identified by numbers. Although silica flour was used in this series to impart additional strength to the set cement, it is not essential to the practice of the invention.

Tests and examples of Series One contained 35 parts by weight, per 100 parts of cement, of silica flour having an average particle size of between about 100 and about 200 mesh.

The composition employed both in the comparative tests and examples of the invention contained 46 parts of water per 100 parts dry weight of Class H cement.

Tests were conducted in accordance with API RP 10B for Testing Oil Well Cements and Cement Additives, as set out in Section 10 Schedule 11, 20,000-foot casing-cementing Well-Simulation Test, at 340° F. circulation temperature. The results are shown on Table I.

TABLE I

Thickening time of class H cement containing 35% by weight of 100 to 200 mesh silica flour and of the indicated amounts either (1) sodium calcium lignosulfonate or (2) borax or both (1) and (2) tested according to API casing cementing schedule 11 simulated 20,000 feet and 340°F. circulating temperature.

| Per cent total retardant (based on 100 parts cement by dry weight) | Retardant Ratio of (1) and (2) | API Thickening Time Tested by Pan-American Consistometer in Hours:Minutes |
|---|---|---|
| none | — | 0:52 |
| 1.0 of (2) | — | 1:01 |
| 2.0 of both (1) & (2) | 1:5 | 1:28 |
| Do | 1:3 | 1:23 |
| Do | 1:1 | 1:28 |
| Do | 3:1 | 1:15 |
| Do | 5:1 | 1:21 |
| 2.5 of both (1) & (2) | 1:5 | 2:54 |
| Do | 1:3 | 5:49 |
| Do | 1:1 | 3:30 |
| Do | 3:1 | 1:06 |
| Do | 5:1 | 1:15 |
| 3 of (1) | — | 1:36 |
| 3 of (2) | — | 1:29 |
| 3 of chromium lignosulfonate | — | 1:40 |
| 3.0 of both (1) & (2) | 1:5 | +6:00 |
| Do | 1:3 | +6:00 |
| Do | 1:1 | +6:00 |
| Do | 3:1 | +6:00 |
| Do | 5:1 | +6:00 |

It is shown by Table I that the use of either sodium calcium lignosulfonate or borax alone does not adequately lessen the rate of setting. However, it does show that when both the sodium calcium lignosulfonate and borax were present in ratios of from 1:5 to 5:1, i.e., a ratio range of 1 part of component (1):1 part to 25 parts of component (2), the effect on the rate of setting was to slow such rate perceptibly as is desired. The chromium lignosulfonate test was run to show that other lignosulfonates alone were no better than the calcium species.

If either component (1) or component (2) had exerted the expected effect on the rate of retardation, as shown when used alone (i.e., if no unexpected synergistic effect occurred) then 1 part of each used together should have retarded the setting rate the cumulative sum of 52 and 36 minutes or 1 hour and 28 minutes. However, the table shows that the retardation caused by one part of each used together retarded the setting rate not less than 1 hour and 15 minutes and when a greater total amount than 1 part of each was employed the rate of retardation was in excess of 6 hours (actually setting at between 12 and 15 hours).

Series Two

This series of tests was conducted to ascertain the thickening time of Class H cement, again containing 35 percent by weight of finely divided silica flour as in Series One, tested according to various schedules in Section 10 of API RP 10B. The amount of retardant consisted of either one or both of the lignosulfonic acid salt and/or borax. The results are shown in Table II.

TABLE II

Thickening time of class H cement containing 35% of silica flour, by weight, retarded by the indicated amounts of (1) sodium calcium lignin and/or (2) borax as tested according to the API casing cement schedules indicated.

| 1 Part Retarder of (1) and 3 Parts of (2) Based on 100 Parts Cement by Weight | THICKENING TIME Hours:Minutes API schedules followed, temperature and simulated depth | | | |
|---|---|---|---|---|
| | 7 172°F 12,000 feet | 8 206°F 14,000 feet | 9 248°F 16,000 feet | 10 300°F 18,000 feet |
| 0.5 | 3:08 | — | — | — |
| 0.6 | 3:21 | — | — | — |
| 0.7 | 4:48 | — | — | — |
| 0.8 | — | 2:18 | — | — |
| 0.9 | — | 2:06 | — | — |
| 1.0 | — | 2:14 | — | — |
| 1.4 | — | 2:08 | — | — |
| 1.6 | — | +6:00 | 1:07 | — |
| 1.8 | — | — | 1:14 | — |
| 2.0 | — | — | 5:23 | 3:40 |
| 2.2 | — | — | — | 4:38 |

It can be seen by examination of Table II that a ratio of 1 part of sodium calcium lignosulfonate to 3 parts of borax, present in the total amounts set forth, and tested according to any one of Schedules 7 to 10 resulted in greatly increased time of setting (i.e., a retarded setting rate). The greater the total amount of the two-component retardant, the longer the time of setting, tested at any given schedule.

Series Three

The test of this series was conducted to show the efficacy of the invention when no silica flour is present. The parts by weight of ingredients per 100 parts of Class H cement were: water 46 and the sodium calcium lignosulfonate: borax retardant in a ratio of 1:1 by weight in a total amount of both of 1.5. The length of time for complete set of the slurry was 24 hours which was substantially the same as when silica flour is present. 24 hours at 380° F. after mixing and promptly pouring into molds, the compressive strength was 1,857 psi. This shows that silica flour, although otherwise shown to be referable in some cementing situations, is not necessary for the practice of the invention.

Although the tests hereinbefore employed silica flour to lessen degradation at high temperature upon aging, this test shows that silica flour is not essential to the practice of the invention.

A field example demonstrating the practice of the invention in an oil field is performed as follows:

A 7" liner is to be cemented in an 8 ½ inch open hole using two cement systems which have been designed for the job. Samples of the field blends of the two systems and a sample of the field mixing water are first submitted for thickening time tests prior to performing the job. The composition of the cement system is that set out in the example of Series Three above.

The well conditions and characteristics of the cementing composition (taken from an actual well to be treated) are as follows:

| Well Conditions | Slurry Properties | System 1 | System 2 |
|---|---|---|---|
| Depth—19,600 feet | slurry weight pounds per gallon | 16.5 | 15.2 |
| BHST—363°F. | slurry yield in ft³/sack | 1.382 | 1.338 |
| BHCT—321°F. (Pressure 16,590 psi | water required in gallons/sack | 5.24 | 5.44 |
| Bottom hole static temperature | | | |
| Bottom hole circulating temperature | | | |

Prior testing of lab blends of field materials indicate the following thickening times:

| Cement Systems | Thickening Time in Hr:Min |
|---|---|
| Cement System 1 | 6:03 Schedule 6 |
| Cement System 2 | 5:22 Schedule 6 |

Compressive strengths for these systems varied from about 5,300 psi at a low retardant concentration of 0.1 part of a 1:3 weight ratio of the lignosulfonate salt to borax at 12,000 feet and 260° F. up to 12,000 psi at 380° F. and a concentration of 2.0 of a 1:3 ratio of the lignosulfonate salt to borax.

The cement slurries so prepared and tested will then be pumped down the annulus between the casing and formation wall to secure the well casing in place. Conventional mixing and pump equipment are to be used.

The cement slurries so emplaced would set at or near 5 hour-6 hour time periods as shown by the tests and would have very satisfactory compressive strength values. The retarded setting rate would enable the operators to perform the job without undue haste even though the downhole temperature is unusually high.

The examples demonstrate the efficacy of the combined retardant effects of the lignosulfonic acid salt and the boric acid salt when both are used in an effective amount and in an effective ratio.

Having described my invention, what I CLAIM and desire to protect by Letters Patent is:

1. A hydraulic cement retarder consisting essentially of a synergistic combination of (i) at least one of a water soluble lignosulfonic acid or water soluble salt thereof, and (ii) at least one of boric acid or a water soluble borate, said combination being effective to retard the rate of set of a hydraulic cement slurry up to a temperature of about 400° F.

* * * * *